(12) United States Patent
Chang et al.

(10) Patent No.: US 12,111,226 B1
(45) Date of Patent: Oct. 8, 2024

(54) HIGH-POWER AND HEAVY-LOAD BACK-TO-BACK PLANETARY GEAR TEST PLATFORM

(71) Applicant: NO.703 Research Institute of CSSC, Harbin (CN)

(72) Inventors: Shan Chang, Harbin (CN); Lidong Jiang, Harbin (CN); Yanjiong Yue, Harbin (CN); Lin Fu, Harbin (CN)

( * ) Notice: Subject to any disclaimer, the term of this patent is extended or adjusted under 35 U.S.C. 154(b) by 0 days.

(21) Appl. No.: 18/399,129

(22) Filed: Dec. 28, 2023

(30) Foreign Application Priority Data

Jun. 7, 2023 (CN) .......................... 202310666673.X (51) Int. Cl.
  *G01M 13/021* (2019.01)
  *G01M 13/026* (2019.01)

(52) U.S. Cl.
  CPC ........ *G01M 13/021* (2013.01); *G01M 13/026* (2013.01)

(58) Field of Classification Search
  CPC .......................... G01M 13/021; G01M 13/026
  See application file for complete search history.

(56) References Cited

U.S. PATENT DOCUMENTS

| | | | |
|---|---|---|---|
| 3,680,373 A | 8/1972 | Kearfott | |
| 9,915,585 B2 * | 3/2018 | Pettersson | ............. G01M 13/04 |
| 2006/0052192 A1 * | 3/2006 | Walter | .................... F16H 55/56 |
| | | | 474/28 |
| 2019/0203774 A1 | 7/2019 | Bager | |

(Continued)

FOREIGN PATENT DOCUMENTS

| | | |
|---|---|---|
| CN | 1788169 A | 6/2006 |
| CN | 102494886 A | 6/2012 |

(Continued)

OTHER PUBLICATIONS

Li, Fajia; Zhu, Rupeng; Bao, Heyun; Xiang, Changle; Liu, Hui, DynamicS Characteristics and Experimental Research on Planetary Gear System, Journal of Nanjing University of Aeronautics and Astronautics, vol. 44, Issue 4, p. 511-519, Aug. 31, 2012.

(Continued)

*Primary Examiner* — Octavia Hollington
(74) *Attorney, Agent, or Firm* — Novoclaims Patent Services LLC; Mei Lin Wong (57) ABSTRACT

A high-power and heavy-load back-to-back planetary gear test bench for full speed and full loading testing, which solves transmission shaft's high processing cost problem and the inability to test in a simulated environment, includes a driving device, first and second shaft couplings, a speed increaser, a speed and torque meter, a back-to-back planetary gearbox closed power system, a clamping groove body coaxially sleeved on an axial positioning protrusion, a clamping component embedded inside an axial positioning groove, and a shaft segment coaxially installed on the clamping groove body to provide an axial displacement by the clamping component to tightly clamp the clamping groove body and the axial positioning protrusion, therefore the clamping groove body generates a radial displacement under an axial pushing of the clamping component and is expanded in the radial direction to tightly connect with the axial positioning groove; and a marine test component for marine environment simulation.

8 Claims, 8 Drawing Sheets

(56) References Cited

U.S. PATENT DOCUMENTS

2024/0125672 A1\* 4/2024 Hambrecht ......... G01M 13/026
2024/0175781 A1\* 5/2024 Wang .................. G01M 13/022

FOREIGN PATENT DOCUMENTS

| CN | 204985379 U | | 1/2016 |
|---|---|---|---|
| CN | 105710829 A | | 6/2016 |
| CN | 106124394 A | | 11/2016 |
| CN | 107036813 A | | 8/2017 |
| CN | 207736201 U | | 8/2018 |
| CN | 208364615 U | | 1/2019 |
| CN | 110487539 A | | 11/2019 |
| CN | 211082596 U | | 7/2020 |
| CN | 211737727 U | | 10/2020 |
| CN | 112013096 A | | 12/2020 |
| CN | 112557025 A | | 3/2021 |
| CN | 116398548 B | \* | 10/2023 |
| DE | 102015226218 A1 | | 6/2017 |

OTHER PUBLICATIONS

Gao, Yufei, Analysis and Response of Z1 Swelling Connected Sets Application, Manufacturing Technology and Machine Tools, vol. 1 Issue 1, p. 92-93, Jan. 31, 2010.

A. Hammami; A. Fernandez Del Rincon; F. Chaari; F. Viadero Rueda; M. Haddar, Dynamic Behaviour of Back to Back Planetary Gear in Run up and Run Down Transient Regimes, Journal of Mechanics, vol. 31, No. 4, p. 481-491, Aug. 31, 2015.

\* cited by examiner

HIGH-POWER AND HEAVY-LOAD BACK-TO-BACK PLANETARY GEAR TEST PLATFORM

FIELD OF INVENTION

The present invention relates to a test platform, in particular to a heavy-duty back-to-back planetary gear test bench for full speed and full load testing of planetary gearboxes, which belongs to the field of planetary gearbox testing.

DESCRIPTION OF RELATED ARTS

Planetary gear transmission is one of the important transmission forms for power transmission, and is widely used in machines and mechanical equipment in automobiles, ships, aerospace, aviation, petrochemical and other fields. Planetary gear transmission has the advantages of small size, compact structure, high power density, large transmission ratio, and high transmission efficiency. Planetary gear transmission is not only suitable for high-speed and high-power, but also has applications in low-speed and high-torque transmission devices. Because it is suitable for almost all power and speed ranges, it has been increasingly widely used.

The gearbox has to be used in various actual operating conditions after undergoing various tests and tests, and each actual operating condition has its own individual characteristics, while the characteristics are related to the service life and the effects of use of the gearbox. For example: in the field of ships, marine gearboxes are the main propulsion transmission devices of ship power systems and have functions such as clutching, deceleration and withstanding propeller thrust. Especially in large ship equipment, the length of the transmission shaft of the transmission system is about 100 meters, about 200 meters or even about 400 meters. When such a long main shaft transmits power, it is affected by the thrust between the propeller and sea water, causing the main shaft and gear box gears to bear heavy loads. Therefore, the performance test of the transmission device is particularly important.

At present, during the production and processing of this type of ultra-long transmission shaft, in order to ensure its coaxiality and reduce the difficulty of processing, the transmission shaft is divided into multi-section shafts, and the multi-section shafts utilize spline connection method for connection. For example: in the publication number CN102494886A, and the invention patent entitled "A shaft-threading device for back-to-back experiments of high-power planetary gearboxes.", the multi-section shafts in this invention patent are connected by splines. Since the key teeth of the spline are evenly distributed on the shaft, the force is evenly distributed, and the weakening of the shaft is reduced, and the stress concentration at the tooth root is small. Also, because there are many key teeth, the load-bearing capacity is also large, and the centering and guiding properties are good. Therefore, the spline connection method used between multi-segment shafts can effectively solve the problem of difficult processing of over-long transmission shafts. However, since the processing of key teeth and key grooves requires the use of special equipment (such as spline shaft processing machine tools) and tools, both the cost of testing the transmission device and the post-production cost of the transmission device are very high.

In addition, during the test process of the transmission device used by large ships, the test environment was only conducted under normal working conditions on land, and the fact that ships are susceptible to the influence of salt spray from the seawater atmospheric environment when sailing on the ocean is not taken into account. Also, the impact of salt spray on the planetary gears in the transmission cannot be tested. The planetary gears have been treated with processing technologies such as anodizing, micro-arc oxidation, electroplating, and coating during the production process to improve the environmental adaptability of metal materials in the marine environment. However, even if the gears are processed as above, it is impossible to predict the adverse consequences caused by the synergy of many factors in the transmission device during actual navigation. For example: when the gearbox is not tightly sealed, or there is a gap of 0.025-0.1 mm between the sealing end cover and the shell, fine sand and gravel enter the gearbox and affect the meshing of the gears. There may also be seawater splashing, raindrop erosion, etc. After the corrosive medium enters and remains in it (referring to the gear tooth surface), its diffusion is restricted, which will lead to accelerated metal corrosion in the slit (referring to the tooth root or the area where tooth surface corrosion has occurred). If this is not discovered in time and the service life of gearboxes is not accurately predicted, this will affect the safety operation of the ship's transmission device. However, the existing test bench cannot simulate the test of planetary gearbox in marine environment.

In summary, the existing planetary gear test bench has the problems of high processing cost of the transmission shaft and the inability to test the planetary gearbox in a simulated marine environment.

SUMMARY OF THE PRESENT INVENTION

An object of the present invention is to solve the problems in the existing planetary gear test bench, that is, high processing cost of transmission shaft and inability to test planetary gearboxes in simulated marine environment, and to provide a high-power and heavy-load back-to-back planetary gear test platform.

The technical solution of the present invention is: a high-power and heavy-load back-to-back planetary gear test platform comprises: a driving device, a first shaft coupling, a speed increaser, a second shaft coupling and a speed and torque meter, wherein the driving device, the first shaft coupling, the speed increaser, the second shaft coupling and the speed and torque meter are connected in sequence from left to right, the test platform further comprises a back-to-back planetary gearbox closed power system and a marine test component, wherein the back-to-back planetary gearbox closed power system comprises a third shaft coupling, a test planetary gearbox, a first linkage mechanism, a torsion shaft assembly, a test companion gearbox, a fourth shaft coupling, second linkage mechanism and a loading device, wherein the third shaft coupling, the test planetary gearbox, the first linkage mechanism, the torsion shaft assembly, the test companion gearbox, the fourth shaft coupling, second linkage mechanism and the loading device are connected in sequence from left to right; the torsion shaft assembly comprises a clamping groove body, a clamping assembly and a plurality of shaft segments, one of the two adjacent shaft segments has an axial positioning protrusion processed on a side end surface at a position opposite to the other adjacent shaft segment, while the other adjacent shaft segment has an axial positioning groove processed at a side end surface on one side at a position corresponding to the axial positioning protrusion, the clamping groove body is coaxially installed on the axial positioning protrusion, the clamping component is embedded inside the axial positioning groove, the other adjacent shaft segment is coaxially installed on the clamping groove body so that the clamping groove body and the axial positioning protrusion are tightly clamped through an axial displacement provided by the clamping component, and the clamping groove body generates a radial displacement under an axial pushing of the clamping component and is expanded in the radial direction to tightly connect with the axial positioning groove of the other adjacent shaft segment; the marine test component is installed on an outer casing of the test planetary gearbox and provides corrosive medium and lubricating oil for the test planetary gearbox to realize simulated marine environment testing.

Furthermore, the clamping groove body is a cylindrical groove body with an inverted tapered groove, and the cylindrical groove body has a plurality of elongated holes along its axial direction.

Furthermore, the clamping component comprises an upper clamping unit, a lower clamping unit and a clamping moving block, wherein the upper clamping unit and the lower clamping unit are arranged at a left side and a right side along the axial direction inside the axial positioning groove while the lower clamping unit is biased against a bottom end surface of the axial positioning groove, the upper clamping unit and the lower clamping unit have a corresponding side facing each other and are processed with inclined surfaces such that the two corresponding sides of the upper clamping unit and the lower clamping unit form an inverted tapered space, the clamping moving block is slidably installed inside the inverted tapered space, and an outer side wall of the clamping moving block is in contact with the inclined surface of the upper clamping unit and the inclined surface of the lower clamping unit respectively.

Furthermore, both the upper clamping unit and the lower clamping unit comprise two semi-circular arc-shaped clamping blocks. The two semi-circular arc-shaped clamping blocks are arranged opposite to each other in the same plane and form a circular ring, and a gap is formed between the two semi-circular arc-shaped clamping blocks.

Furthermore, the torsion shaft assembly comprises a disassembly device. The disassembly device is embedded in the shaft segment and extends to the side of the axial positioning protrusion until it extends to push down the clamping groove body, wherein the disassembly device comprises a screw, a disassembly nut, a driven bevel gear, a driving bevel gear, an axle and an end cover, the screw is horizontally and rotatably installed along the axis of the shaft segment in the axial opening of the shaft segment, the axle is installed vertically and rotatably in a vertical opening of the shaft segment along the radial direction of the shaft segment, and the axial opening and the vertical opening are interconnected; the driving bevel gear is installed on the wheel shaft, the driven bevel gear is installed on the head of the screw, the driving bevel gear meshes with the driven bevel gear, the disassembly nut is installed on an end portion of the screw, the disassembly nut moves horizontally on the screw and extended to the axial positioning protrusion to push down the clamping groove body, and the end cover is installed on the vertical opening.

Furthermore, the marine test component comprises a component casing, a sealing cover, a corrosive medium inlet unit and a plurality of lubrication units, wherein the component casing is installed on the test planetary gearbox through a sealing cover, the plurality of lubrication units are installed vertically in the component casing and provide lubrication media inside the test planetary gearbox through dripping lubrication media, the corrosive medium inlet unit is sealed and inserted into the lower part of the component casing and provides corrosive medium to the inside of the test planetary gearbox.

Furthermore, each lubrication unit comprises an annular cylinder, an annular magnet, an aluminum slide and a lubricating oil filter, wherein the aluminum slide is installed horizontally in a lower part of the component casing, the component casing is a casing made of aluminum, the lubricating oil filter is embedded on the annular magnet, and the annular cylinder is vertically sealed and installed on the annular magnet.

Preferably, the lubricating oil filter has a middle part with a concave downward structure.

Preferably, a mesh size of the lubricating oil filter is 150-300 mesh.

Furthermore, the corrosive medium inlet unit comprises a medium inlet pipe and a medium nozzle, wherein the medium inlet pipe is sealed and inserted into the lower part of the component casing and extends toward the component casing, the medium nozzle is sealingly connected to one end of the medium inlet pipe located in the component casing.

Preferably, the medium nozzle comprises a nozzle housing—and at least one set of spiral blades—, wherein the spiral blade—is installed in the nozzle housing—to realize a disturbance of an entrance angle of the corrosive medium.

Compared with the existing technologies, the present invention has the following advantageous effects:

1. The present invention is suitable for testing high-power planetary gearboxes in ships. The test platform is a power closed system, which does not require additional closed test boxes and related transmission parts. The power flow circulates in a closed cycle within two planetary reducers (referring to the test planetary gearbox 7 and the test companion gearbox 10), therefore the power consumption of the driving device is even less, as long as its power is enough to overcome the friction power consumption of the test platform. The power of the planetary gearbox test is loaded by the loader in the mechanical power closed system. The principle is clear and easy to implement.

2. The present invention utilizes a loader and connects between the input terminal and the input terminal by using the transmission shaft to pass through the test planetary gearbox and the companion test planetary gearbox to connect internally so that a closed state is formed. During the test, the test bench is driven by the power source (referring to the driving device 1), and the driving power only needs to overcome the frictional power consumption of the gearbox closed system. Torque is applied through the loader, and the torque is loaded to the test planetary gearbox and companion test planetary gearbox through the torsion shaft assembly to form a closed power flow. Mechanical loading is used to ensure that the test can be carried out under full load and other load conditions.

3. According to the present invention, the torsion shaft assembly is also formed by connecting multiple shaft sections, but the multiple shaft sections are integrated by the synergy of the clamping groove body and the clamping assembly to connect two adjacent shaft sections into one body. There is no need to use special equipment for processing. When processing the shaft segment, it is just needed to machine the axial positioning protrusion and axial positioning groove directly. It not only reduces the processing difficulty, but also reduces the processing steps, thereby effectively reducing the production cost of the torsion shaft assembly.

At the same time, after the clamping groove body and the clamping assembly used in the present invention are connected together, the outer diameters of the two adjacent shaft segments are the same, which does not affect the transmission parts such as bearings or gears installed on the torsion shaft. Moreover, the above-mentioned connection method of the present invention is reliable in connection. During the test of the torsion shaft, when the rotation speed of the torsion shaft is above 3500 r/m, its large torque transmission is not affected. Therefore, the torsion shaft assembly of the present invention, on the premise of reducing production costs, can also meet the needs of actual use conditions.

4. The test bench (platform) of the present invention is also equipped with a marine test component, which can simulate various complex situations that a real large ship may encounter when traveling at sea. For example, when the gearbox is used for a long time, it may face high salt spray, sand, gravel and seawater splashing, etc. According to the present invention, the external corrosive medium is introduced through the corrosive medium introduction unit. At the same time, the present invention uses different numbers of spiral blades to adjust the flow direction of the corrosive medium entering the nozzle, thereby achieving a simulation close to the most realistic situation encountered in maritime navigation. It provides convenience for the testing of large marine transmission devices, especially under the influence of comprehensive environmental factors, the accurate collection of gear failure data parameters is convenient to provide maintenance workers with corresponding theoretical and data basis for research and judgment during the maintenance process.

Wherein, 1 refers to a driving device, 2 refers to a first shaft coupling, 3 refers to a speed increaser, 4 refers to a second shaft coupling, 5 refers to a speed and torque meter, 6 refers to a third shaft coupling, 7 refers to a test planetary gearbox, 8 refers to a first linkage mechanism, 9 refers to a torsion shaft assembly, 9-1 refers to a shaft segment, 9-2 refers to a clamping groove body, 9-3 refers to a clamping assembly, 9-4 refers to a axial positioning protrusion, 9-5 refers to a axial positioning groove, 9-6 refers to an elongated hole, 9-7 refers to a upper clamping unit, 9-8 refers to a lower clamping unit, 9-9 refers to a clamping moving block, 9-10 refers to a semi-circular arc-shaped clamping block, 9-11 refers to a screw, 9-12 refers to a disassembly nut, 9-13 refers to a driven bevel gear, 9-14 refers to a driving bevel gear, 9-15 refers to an axle, 9-16 refers to an end cover, 9-17 refers to a bearing seat, 9-18 refers to a wheel axle fixing seat, 9-19 refers to a wheel axle mounting seat, 9-20 refers to a screw center alignment seat, 10 refers to a test companion gearbox, 11 refers to a fourth shaft coupling, and 12 refers to a second linkage mechanism, 13 refers to a loading device, 14 refers to a component casing, 15 refers to a sealing cover, 16 refers to a lubrication unit, 16-1 refers to a annular cylinder, 16-2 refers to a annular magnet, 16-3 refers to a aluminum slide, 16-4 refers to a lubricating oil filter, 17 refers to a corrosive medium inlet unit, 17-1 refers to a medium inlet pipe, 17-2 refers to a medium nozzle, 17-2-1 refers to a nozzle housing, 17-2-2 is a set of spiral blades and 18 refers to a back-to-back planetary gearbox closed power system.

In addition, 19 refers to a transmission shaft, 20 refers to a test second-stage sun gear, 21 refers to a test second-stage planetary carrier, 22 refers to a test second-stage planetary gear, 23 refers to a test second-stage internal ring gear, 24 refers to a test first-stage sun gear, and 25 refers to a test first-stage planetary gear, 26 refers to a first-stage internal ring gear, 27 refers to a test first-stage planetary carrier, 28 refers to a test second-stage floating ring gear, 29 refers to a first coupling member, 30 refers to an intermediate shaft, and 31 refers to a second coupling member, 32 refers to a test-companion first-stage planet carrier, 33 refers to a test-companion first-stage sun gear, 34 refers to a test-companion second-stage floating ring gear, 35 refers to a test-companion first-stage planetary gear, 36 refers to a test-companion first-stage internal ring gear, 37 refers to a test-companion second-stage sun gear, 38 refers to a test-companion second-stage planetary gear, 39 refers to a test-companion second-stage internal ring gear, 40 refers to a test-companion second-stage planetary carrier, and 41 refers to a third coupling member.

DETAILED DESCRIPTION OF THE PREFERRED EMBODIMENT

Preferred Embodiment 1: This embodiment is described below with reference to FIG. 1 to FIG. 13. According to this embodiment, a high-power and heavy-load back-to-back planetary gear test bench (platform) comprises a driving device 1, a first shaft coupling 2, a speed increaser 3, a second shaft coupling 4 and a speed and torque meter 5. The driving device 1, the first shaft coupling 2, the speed increaser 3, the second shaft coupling 4 and the speed and torque meter 5 are connected in sequence from left to right. The test bench also comprises a back-to-back planetary gearbox closed power system 18 and a marine test component 140. The back-to-back planetary gearbox closed power system 18 comprises a third shaft coupling 6, a test planetary gearbox 7, a first linkage mechanism 8, a torsion shaft assembly 9, a test companion gearbox 10, a fourth shaft coupling 11, second linkage mechanism 12 and a loading device 13. The third shaft coupling 6, the test planetary gearbox 7, the first linkage mechanism 8, the torsion shaft assembly 9, the test companion gearbox 10, the fourth shaft coupling 11, second linkage mechanism 12 and the loading device 13 are connected in sequence from left to right. The torsion shaft assembly 9 comprises a clamping groove body 9-2, a clamping assembly 9-3 and a plurality of shaft segments 9-1. One of the two adjacent shaft segments 9-1 has an axial positioning protrusion 9-4 processed on a side end surface at a position opposite to the other adjacent shaft segment 9-1; the other adjacent shaft segment 9-1 has an axial positioning groove 9-5 processed at a side end surface on one side at a position corresponding to the axial positioning protrusion 9-4; the clamping groove body 9-2 is coaxially installed on the axial positioning protrusion 9-4; and a clamping component 9-3 is embedded inside the axial positioning groove 9-5; the other adjacent shaft segment 9-1 is coaxially installed on the clamping groove body 9-2, and tightly clamps the clamping groove body 9-2 and the axial positioning protrusion 9-4 through an axial displacement provided by the clamping component 9-3; the clamping groove body 9-2 generates a radial displacement under an axial pushing of the clamping component 9-3 and is expanded in the radial direction to tightly connect with the axial positioning groove 9-5 of the other adjacent shaft segment 9-1; the marine test component 140 is installed on an outer casing 71 of the test planetary gearbox 7 and provides corrosive medium and lubricating oil for the test planetary gearbox 7 to realize simulated marine environment testing.

Wherein, according to this embodiment, the loading device 13 comprises a transmission shaft 19 connected to the torsion shaft assembly 9 through gear coupling or spline connection, and provides a required torque to the test bench.

According to this embodiment, the driving device 1 of the test bench provides a required rotational speed for the test bench, and its power is only used to overcome a friction power consumption of the entire test platform, which is related to a friction power consumption of each component in the test platform, generally 5~10% of the power of the test planetary gearbox 7. The driving device 1 drives the entire test platform to reach the test speed required for the test planetary gearbox 7, and then the loading device 13 provides the required torque for the test planetary gearbox 7, loading to any torque value in real time, and the loading is smooth and without impact.

Figure 1:
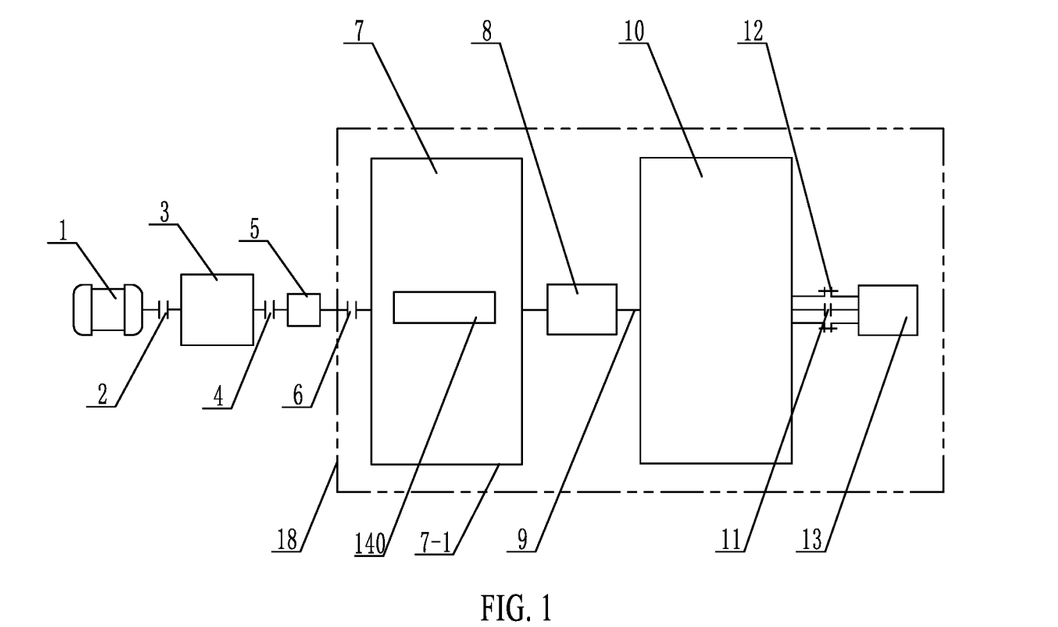
FIG. 1 is a schematic top view of an overall structure of a test platform of the present invention.
Figure 2:
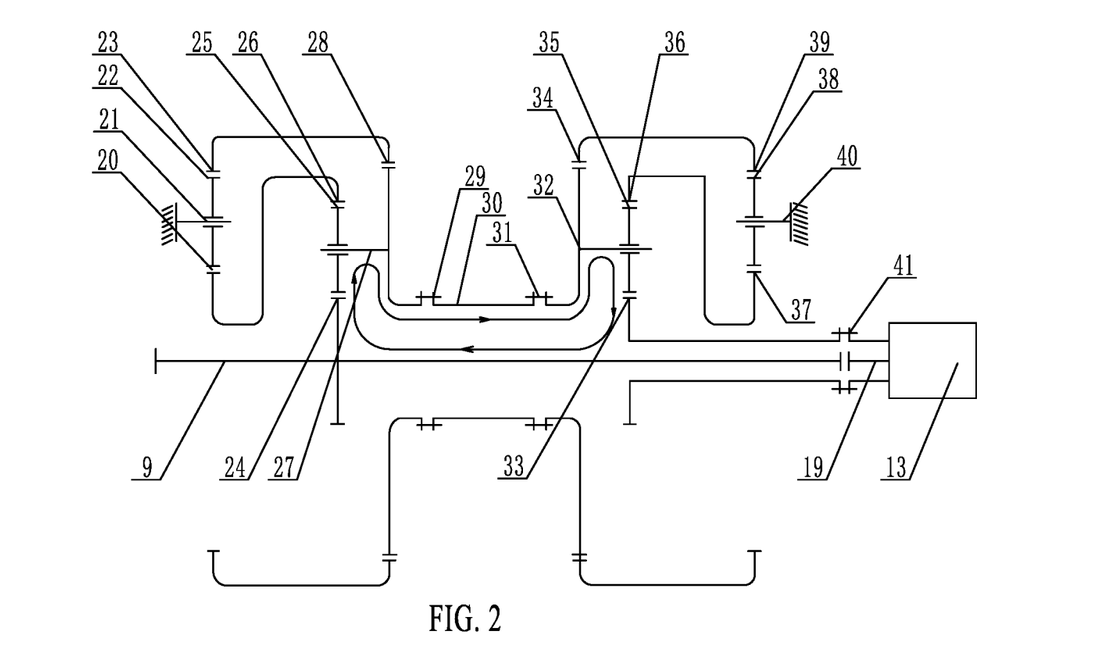
FIG. 2 is a schematic diagram showing the transmission of a back-to-back planetary gearbox closed power system, wherein the arrow indicates a transmission direction of the closed power flow.
Figure 3:
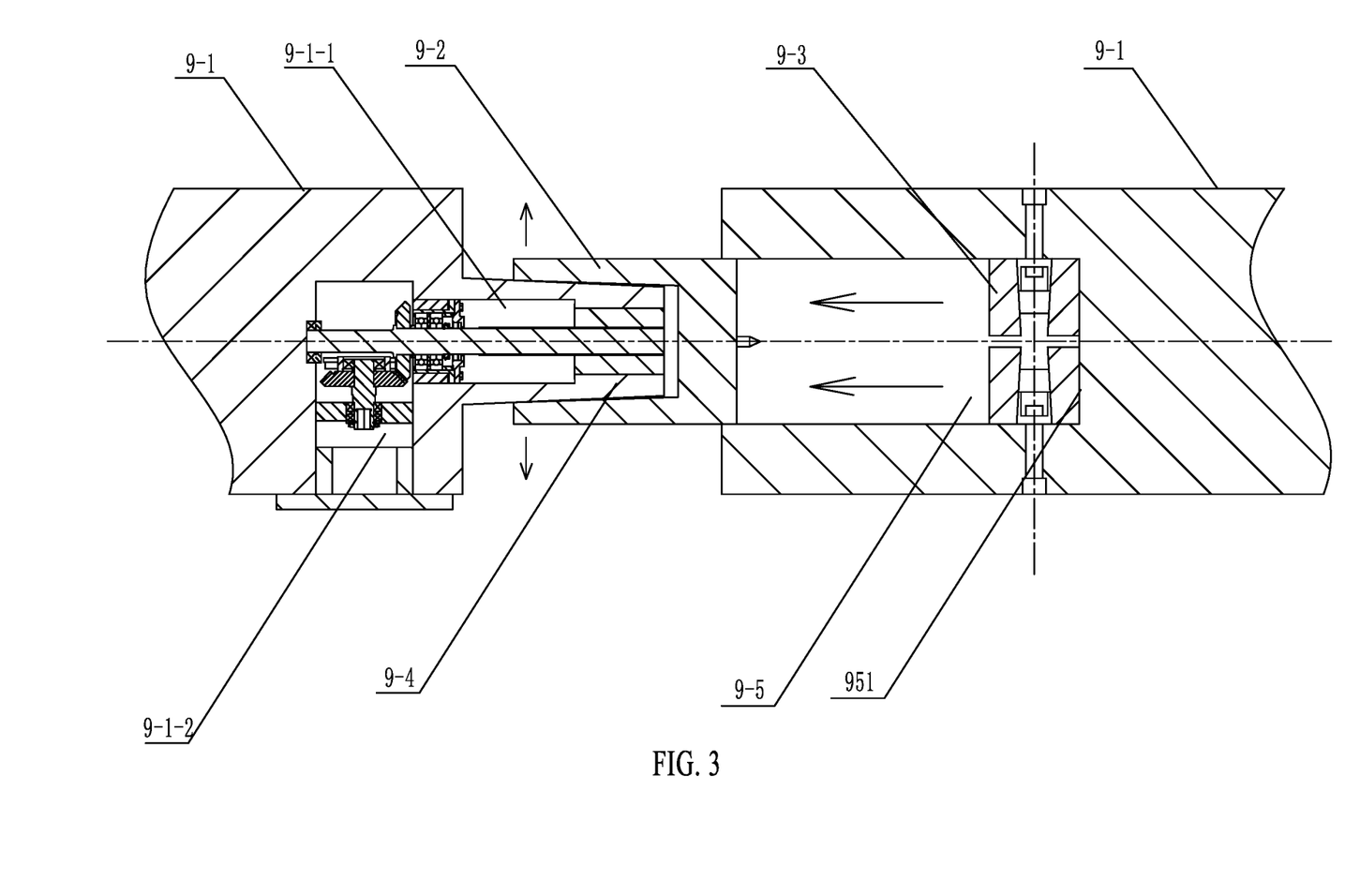
FIG. 3 is an exploded schematic diagram of two adjacent shaft segments 9-1 before assembly, wherein the arrows pointing left and right indicate the direction of radial displacement of the clamping groove body 9-2 under the axial push of the clamping assembly 9-3; the two arrows pointing downwards indicate the axial pushing direction of clamping assembly 9-3.
Figure 4:
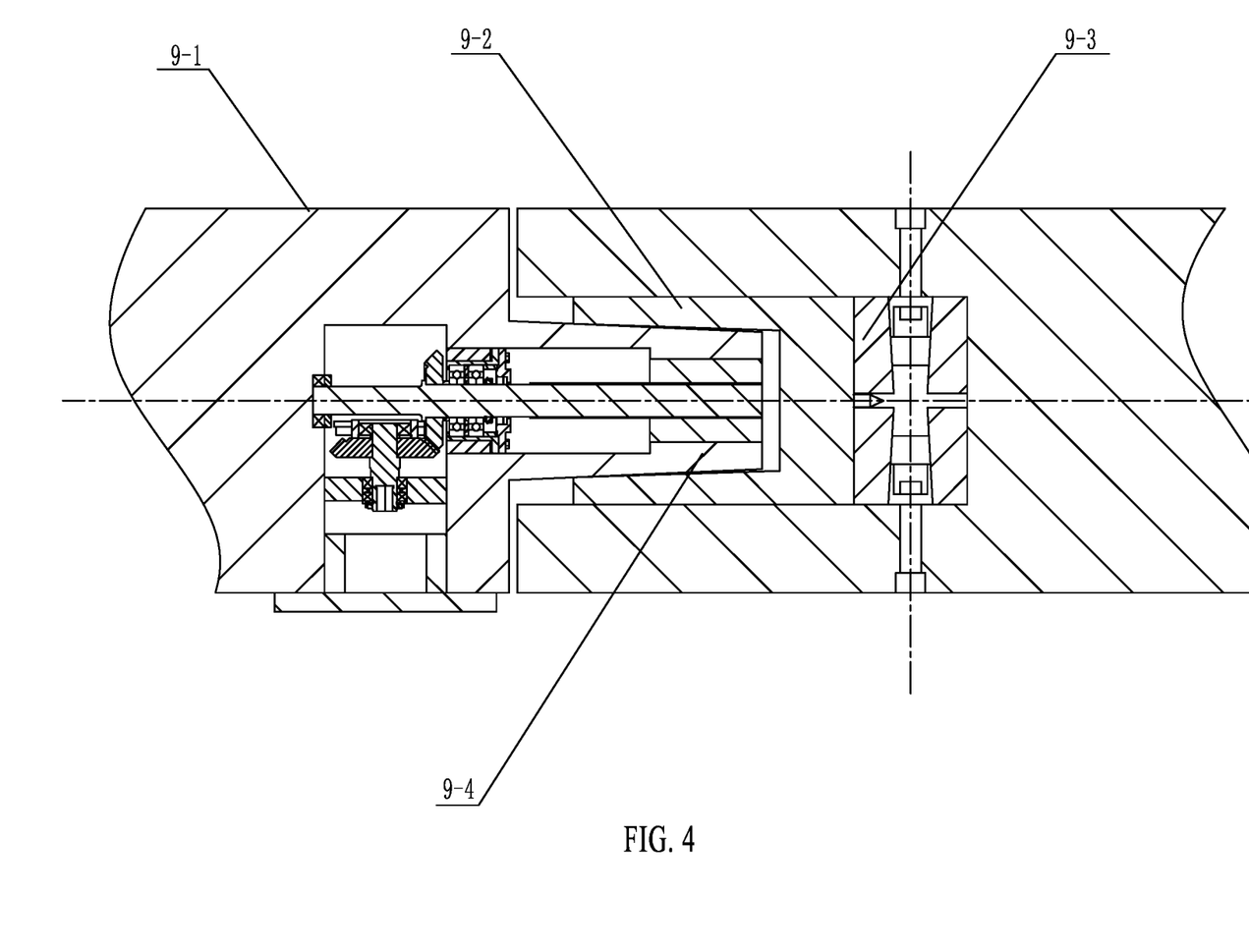
FIG. 4 is a schematic diagram of FIG. 3 after assembly.

According to this embodiment, the test planetary gearbox 7 comprises a test second-stage sun gear 20, a test second-stage planetary carrier 21, a test second-stage planetary gear 22, a test second-stage internal ring gear 23, a test first-stage sun gear 24, a test first-stage planetary gear 25, a first-stage internal ring gear 26, a test first-stage planetary carrier 27 and a test second-stage floating ring gear 28, wherein the test first-stage sun gear 24 is installed on the torsion shaft assembly 9, the test first-stage planetary gear 25 is installed on the test first-stage planetary carrier 27, the external teeth of the test first-stage planetary gear 25 mesh with the external teeth of the test first-stage sun gear 24; the test second-stage sun gear 20 is installed on the test first-stage planetary gear 25, and the internal teeth of the test first-stage internal ring gear 26 of the test second-stage sun gear 20 mesh with the external teeth of the test first-stage planetary gear 25. The test second-stage planetary gear 22 is installed on the test second-stage planetary carrier 21. The external teeth of the test second-stage planetary gear 22 mesh with the external teeth of the test second-stage sun gear 20. The test second-stage floating ring gear 28 is installed on the test second-stage planetary gear 22 and the test first-stage planetary carrier 27. The internal teeth of the test second-stage internal ring gear 23 of the test second-stage floating ring gear 28 mesh with external teeth of the test second-stage planetary gear 22 and the external teeth of the test first-stage planetary carrier 27 respectively.

According to this embodiment, the first linkage mechanism 8 comprises a first coupling member 29, an intermediate shaft 30 and a second coupling member 31, wherein the first coupling member 29, the intermediate shaft 30 and the second coupling member 31 are connected in sequence from left to right, which are used to connect the test planetary gearbox 7 and the test companion gearbox 10.

According to this embodiment, the first coupling member 29 is connected to the test first-stage planet carrier 27 of the test planetary gearbox 7, and the second coupling member 31 is connected to the test-companion first-stage planet carrier 32 of the test companion gearbox 10.

According to this embodiment, the test companion gearbox 10 comprises a test-companion first-stage planet carrier 32, a test-companion first-stage sun gear 33, a test-companion second-stage floating ring gear 34, a test-companion first-stage planetary gear 35, a test-companion first-stage internal ring gear 36, and a test-companion second-stage sun gear 37, a test-companion second-stage planetary gear 38, a test-companion second-stage internal ring gear 39 and a test-companion second-stage planetary carrier 40; the test-companion first-stage sun gear 33 is coaxially installed on the torsion shaft assembly 9, and the test-companion first-stage planetary gear 35 is installed on the test-companion first-stage planet carrier 32, external teeth of the test-companion first-stage planetary gear 35 mesh with external teeth of the test-companion first-stage sun gear 33, the test-companion second-stage sun gear 37 is installed on the test-companion first-stage planetary gear 35, and internal teeth of the test-companion first-stage internal ring gear 36 of the test-companion second-stage sun gear 37 mesh with external teeth of the test-companion first-stage planetary gear 35, the test-companion second-stage planetary gear 38 is installed on the test-companion second-stage planetary carrier 40, and the test-companion second-stage internal ring gear 39 is installed on the test-companion first-stage planet carrier 32 and the test-companion second-stage planetary gear 38, internal teeth of the test-companion second-stage floating ring gear 34 on the test-companion second-stage internal ring gear 39 mesh with external teeth of the test-companion first-stage planet carrier 32, internal teeth of the test-companion second-stage internal ring gear 39 mesh with external teeth of the test-companion second-stage planetary gear 38.

According to this embodiment, the test-companion gearbox 10 further comprises a third coupling member 41, wherein the test-companion first-stage sun gear 33 and the loading device 13 are connected through the third coupling member 41.

For the test of planetary gearbox, according to its different driving and loading methods, it is divided into open test bench and closed power flow test bench. In open test bench, the power of the power source (motor), test gearbox, and power consumption device needs to be equal to the power of the test gearbox. For closed power flow test bench, the test planetary gearbox and the companion test planetary gearbox are connected back-to-back (output end and output end) through the coupling mechanism.

The present invention can be used for the full-speed and full-load performance test of the planetary gearbox, and is especially suitable for the dynamic balance test of the heavy-load planetary gearbox.

The present invention is particularly aimed at the outstanding problems of high cost, high power consumption, and poor economic efficiency of the test platform during the full-load long-term performance test or reliability test of the heavy-load planetary gearbox. The present invention utilizes the coaxial characteristics of the input and output of the planetary gearbox and adopts a back-to-back test method to realize the full-speed and full-load performance test of the planetary gearbox. At the same time, the transmission efficiency can be accurately measured through the arranged speed and torque meter.

According to the present invention, the test platform (bench) occupies relatively smaller area, the loading is processed by using mechanically closed power, the power of the driving device required is only the friction power consumption in the closed system, and the power is relatively small, and the loading device can be loaded arbitrarily in real time, therefore the platform is suitable for planetary gearbox performance testing, especially for high-power planetary gearboxes.

Preferred Embodiment 2: This embodiment is described below with reference to FIG. 3, FIG. 4 and FIG. 6. According to this embodiment, the clamping groove body 9-2 is a cylindrical groove body with an inverted tapered groove, and the cylindrical groove body has a plurality of elongated holes 9-6 along its axial direction. With this arrangement in actual use, the taper of the cylindrical groove body of the inverted tapered groove is matched with an outer circumferential surface of the axial positioning protrusion 9-4, and the outer circumferential taper of the axial positioning protrusion 9-4 is 1:15-1:20, which is convenient to ensure the tight fit coupling between the clamping groove body 9-2 and the axial positioning protrusion 9-4, and the micro-displacement expansion of the plurality of elongated holes 9-6 facilitates the axial positioning protrusion 9-4 to be firmly clamped in the axial positioning groove 9-5, and the precise transmission is realized by friction. Other components and connection relationships are the same as in the Preferred Embodiment 1.

Figure 6:
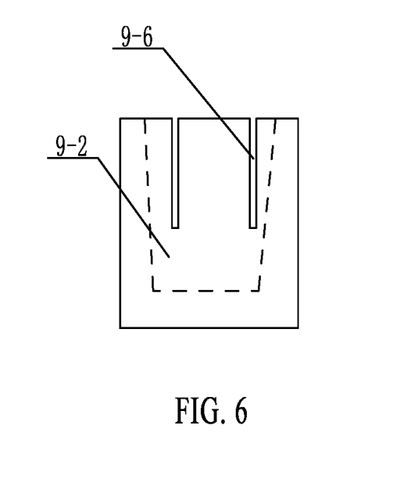
FIG. 6 is a schematic structural diagram of the clamping groove body 9-2.

According to this embodiment, the elongated holes 9-6 are opened in a circular array along the circumferential direction, and the number of elongated holes 9-6 is 4 to 8. When in actual use, 4 or 6 elongated holes 9-6 are preferred. This arrangement can ensure the clamping degree of the clamping groove body 9-2. When the elongated holes on the cylindrical groove body is subjected to extrusion force, micro-displacement occurs in the radial direction, which can also play a role in tightening the axial positioning groove 9-5 to ensure the reliability of the connection between the two adjacent shaft segments 9, and also ensure accurate torque transmission.

Preferred Embodiment 3: This embodiment is described below with reference to FIG. 3, FIG. 4 and FIG. 5. According to this embodiment, the clamping component 9-3 comprises an upper clamping unit 9-7, a lower clamping unit 9-8 and a clamping moving block 9-9, wherein the upper clamping unit 9-7 and the lower clamping unit 9-8 are arranged at a left side and a right side along the axial direction inside the axial positioning groove 9-5 while the lower clamping unit 9-8 is biased against a bottom end surface 951 of the axial positioning groove 9-5, the upper clamping unit 9-7 and the lower clamping unit 9-8 have a corresponding side facing each other and are processed with inclined surfaces such that the two corresponding sides of the upper clamping unit 9-7 and the lower clamping unit 9-8 form an inverted tapered space, and the clamping moving block 9-9 is slidably installed inside the inverted tapered space, and an outer side wall of the clamping moving block 9-9 is in contact with the inclined surface of the upper clamping unit 9-7 and the inclined surface of the lower clamping unit 9-8 respectively.

Figure 5:
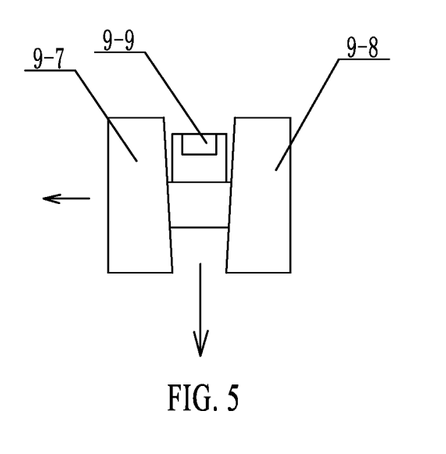
FIG. 5 is a schematic structural diagram of the clamping assembly 9-3, wherein the arrow pointing to the left indicates the axial movement direction of the upper clamping unit 9-7; the arrow pointing downward indicates the movement direction of the clamping moving block 9-9 when it is subjected to a radial force.

With this arrangement, since one side surface of the lower clamping unit 9-8 is biased against the bottom end surface 951 of the axial positioning groove 9-5, the lower clamping unit 9-8 will not produce micro-displacement when the clamping moving block 9-9 exerts force on the lower clamping unit 9-8. The upper clamping unit 9-7 produces a micro-displacement towards the axial positioning groove 9-5, and this micro-displacement causes the clamping groove body 9-2 to move axially and expand outward, and the inner wall of the axial positioning groove 9-5 tightly clamps the clamping groove body 9-2, thereby realizing the connection between two adjacent shaft segments 9-1. Other components and connection relationships are the same as those in the Preferred Embodiment 1 or 2.

When this embodiment is in actual use, a plurality of counterbores are provided on the outer circumference of the shaft segment 9-1 which is provided with the axial positioning groove 9-5, the upper part of the clamping moving block 9-9 is processed with an inner hexagonal hole, the lower end face of the bolt in the vertical section of the external "L" shaped bolt wrench for screwing and disassembly is processed into an external hexagon, the bolt and is screwed into the counterbore. During the process of downward movement of the bolt, the external hexagonal shape of the bolt is inserted into the inner hexagonal hole of the clamping moving block 9-9, then during the rotation of the "L" shaped bolt wrench, the clamping moving block 9-9 is driven to move downward, this in turn provides driving power for the upper clamping unit 9-7 to move in the axial direction. When disassembling, the operation is reversed.

Preferred Embodiment 4: This embodiment is described below with reference to FIG. 3 to FIG. 6. According to this embodiment, both the upper clamping unit 9-7 and the lower clamping unit 9-8 comprises two semi-circular arc-shaped clamping blocks 9-10. The two semi-circular arc-shaped clamping blocks 9-10 are arranged opposite to each other in the same plane and form a circular ring, and there is a gap 9-10-1 between the two semi-circular arc-shaped clamping blocks 9-10.

Figure 7:
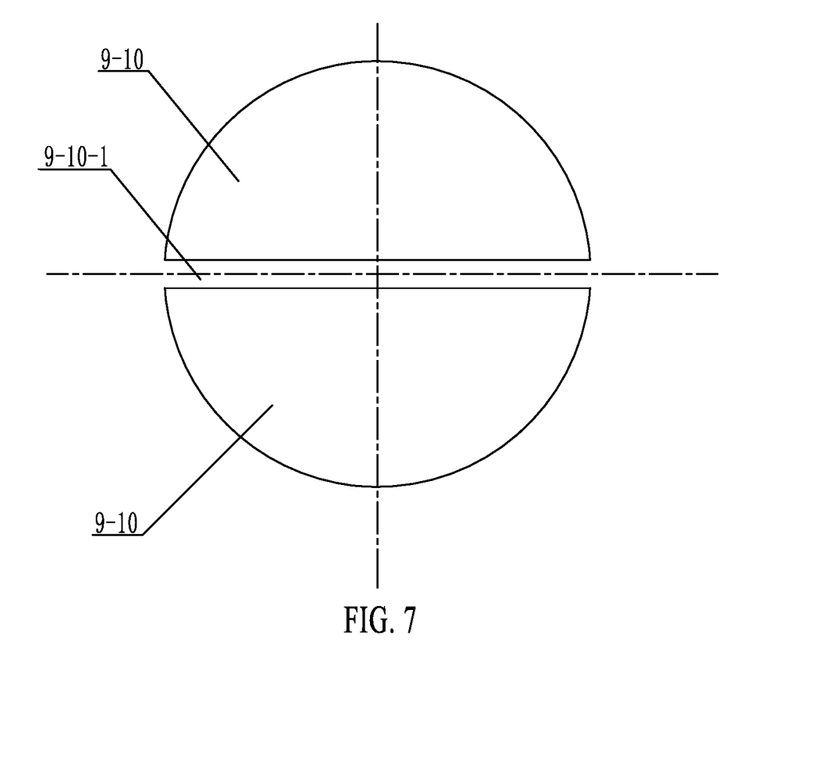
FIG. 7 is a schematic structural diagram of the semi-circular arc-shaped clamping block 9-10.

With this arrangement, the gap 9-10-1 is used to realize the positioning of the clamping tank body 9-2. The range of the gap is 3 mm-10 mm. A positioning column is processed on the outer end face of the clamping groove body 9-2. During assembly, the positioning column can be accurately inserted into the gap, thereby ensuring the coaxiality of the connection between the two adjacent shaft segments 9-1. Other components and connection relationships are the same as those in the Preferred Embodiment 1, 2 or 3.

Preferred Embodiment 5: This embodiment is described below with reference to FIG. 3, FIG. 4, FIG. 12, and FIG. 13. According to this embodiment, the torsion shaft assembly 9 also comprises a disassembly device 90. The disassembly device 90 is embedded in the shaft segment 9-1 and extends to the side of the axial positioning protrusion 9-4 until it extends to push down the clamping groove body 9-2. The disassembly device 90 comprises a screw 9-11, a disassembly nut 9-12, a driven bevel gear 9-13, a driving bevel gear 9-14, an axle 9-15 and an end cover 9-16. The screw 9-11 is installed horizontally and rotatably in the axial opening 9-1-1 of the shaft segment 9-1 along the axis of the shaft segment 9-1. The axle 9-15 is installed vertically and rotatably in a vertical opening 9-1-2 of the shaft segment 9-1 along the radial direction of the shaft segment 9-1, and the axial opening 9-1-1 is passage through the vertical opening 9-1-2. The driving bevel gear 9-14 is installed on the wheel shaft 9-15, the driven bevel gear 9-13 is installed on the head 9-11-1 of the screw 9-11, the driving bevel gear 9-14 meshes with the driven bevel gear 9-13, the disassembly nut 9-12 is installed on an end portion 9-11-2 of the screw 9-11, the disassembly nut 9-12 moves horizontally on the screw 9-11 and stretches out the axial positioning protrusion 9-4 to push down the clamping groove body 9-2, and the end cover 9-16 is installed on the vertical opening (9-1-2).

Figure 12:
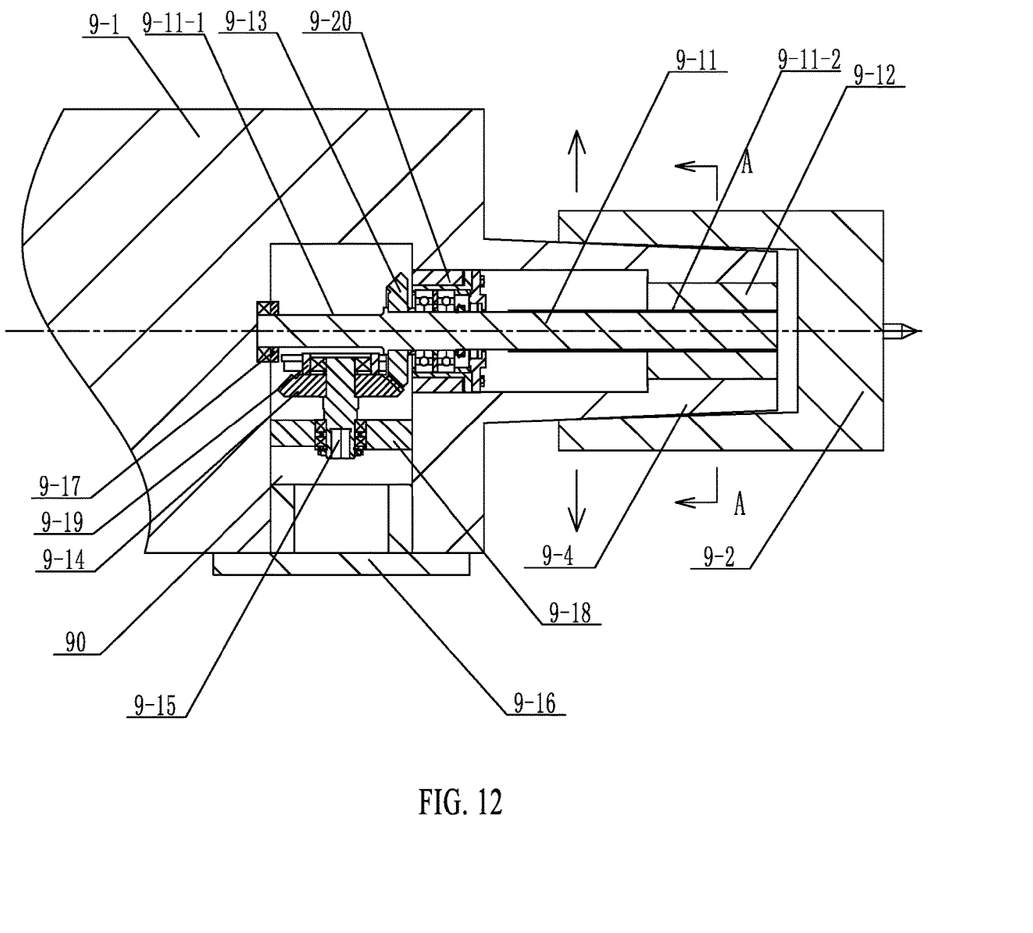
FIG. 12 is an enlarged view of the shaft segment 9-1, wherein the arrows pointing up and down indicate the direction of the radial displacement of the clamping groove body 9-2 under the axial pushing force of the clamping assembly 9-3.
Figure 13:
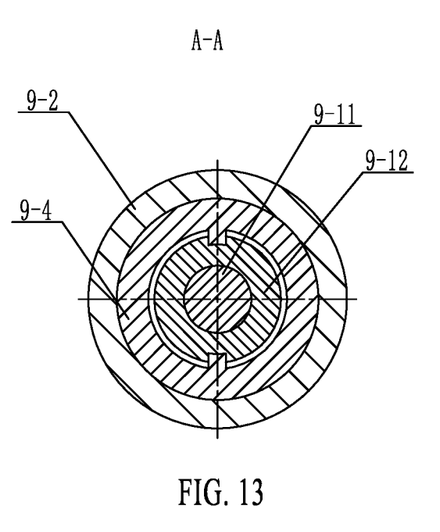
FIG. 13 is a cross-sectional view along line A-A of FIG. 12.

With this arrangement, when it is necessary to disassemble the extra-long shaft system, first remove the end cover 9-16, and then use an external hexagonal wrench to an external hexagonal wrench to insert into a tail portion of axle 9-15, turn the wrench, and the wrench drives the axle 9-15, the driving bevel gear 9-14, the driven bevel gear 9-13 and the screw 9-11 to move. The disassembly nut 9-12 located on the screw 9-11 moves horizontally to the right along its thread until it contacts the bottom end surface 951 of the clamping groove body 9-2 and applies axial force, and pushes down the clamping groove body 9-2 to complete the disassembly of the clamping groove body 9-2 on the axial positioning protrusion 9-4. Other components and connection relationships are the same as any one of those in the Preferred Embodiments 1, 2, 3 or 4.

It is worth mentioning that in order to ensure that the disassembly nut 9-12 can achieve horizontal axis movement, a guiding groove is provided in the outer circumferential direction of the disassembly nut 9-12, and the guiding groove is coaxially arranged with the disassembly nut 9-12. At the same time, a guiding protrusion that slides with the guiding groove is processed in the axial opening of the axial positioning protrusion 9-4. The guiding protrusion is located in the guiding groove to realize the horizontal sliding of the disassembly nut 9-12 along its axis.

When this embodiment is in actual use, the disassembly device 90 further comprises a bearing seat 9-17, a wheel axle fixing seat 9-18, a wheel axle mounting seat 9-19 and a screw center alignment seat 9-20. The head 9-11-1 of the screw 9-11 is a smooth head, which is used to assemble the driven bevel gear 9-13.

The head 9-11-1 of the screw 9-11 and the driven bevel gear 9-13 are connected by key connection, the screw center alignment seat 9-20 is installed in the axial opening, the screw center alignment seat 9-20 is arranged coaxially with the shaft segment 9-1, the screw 9-11 is installed in the screw center alignment seat 9-20 through bearing rotation, the end portion 9-11-2 of the screw 9-11 has external thread, the screw 9-11 and the disassembly nut 9-12 cooperate with each other to form a nut and screw pair, the wheel axle mounting base 9-19 is fixedly installed in the vertical opening, and the axle 9-15 is rotatably inserted into the wheel axle mounting base 9-19, an upper part of the axle 9-15 is connect with the wheel axle fixing seat 9-18 located in the vertical opening through a bearing so as to limit the axis angle of the axle 9-15, and also ensure that the shaft segment 9-1 maintains structural integrity during high-speed rotation, and the driving bevel gear 9-14 and the axle 9-15 are connected by key connection.

It is also noted that when the disassembly device 90 of this embodiment is installed, the screw center alignment seat 9-20 is provided with a spacing recess that matches the guiding protrusion processed in the axial opening of the axial positioning protrusion 9-4. The spacing recess can facilitate the screw center alignment seat 9-20 to smoothly install in the axial opening of the axial positioning protrusion 9-4 after the screw 9-11 is installed, which not only facilitates installation, but also avoids the installation difficulties caused by the provision of the guiding protrusion.

In this embodiment, a disassembly device 90 is used. The disassembly device 90 can be disassembled after the experiment is completed to avoid the waste of the shaft segment 9-1 and can be reused, thereby saving costs.

Preferred Embodiment 6: This embodiment is described below with reference to FIG. 7 and FIG. 8. According to this embodiment, the marine test component 140 comprises a component casing 14, a sealing cover 15, a corrosive medium inlet unit 17 and a plurality of lubrication units 16. The component casing 14 is installed on the test planetary gearbox 7 through a sealing cover 15. The plurality of lubrication units 16 are installed vertically in the component casing 14 and provide lubrication media inside the test planetary gearbox 7 through dripping lubrication media. The corrosive medium inlet unit 17 is sealed and inserted into the lower part 14-1 of the component casing 14 and provides corrosive medium to the inside of the test planetary gearbox 7.

Figure 8:
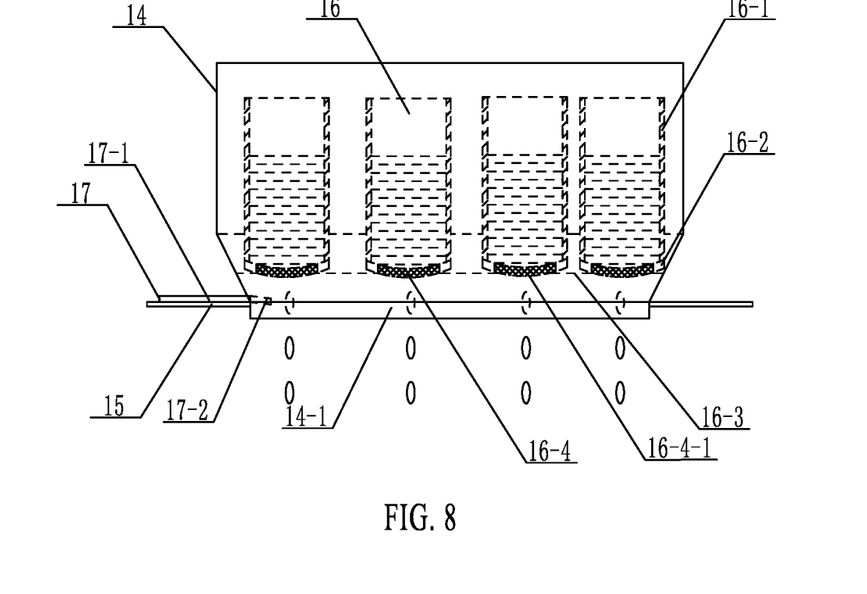
FIG. 8 is a schematic structural diagram of the marine test component.
Figure 9:
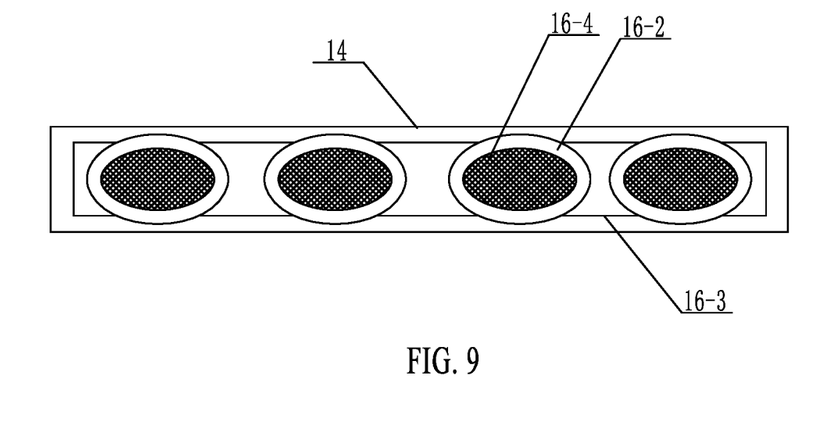
FIG. 9 is a schematic top view of the marine test component.

With this arrangement, the outer casing 71 of the test planetary gearbox 7 is provided with an oil drain hole. In this embodiment, the lubrication unit 16 is used to lubricate the test planetary gearbox 7. The corrosive medium inlet unit 17 is connected to an external marine condition simulation device. The number of corrosive medium inlet units 17 is two or more, mainly for providing environmental simulations such as salt spray, raindrops, sand and gravel, etc. The external marine condition simulation device is an existing technology and will not be described in detail here. Other components and connection relationships are the same as any one of those in the Preferred Embodiments 1-5.

In addition, when this embodiment is actually used, there will be an environment simulation of high temperature and high humidity. The simulated high temperature is achieved by adding heating coils to the casing. When salt spray is introduced into a high-humidity environment, it can be achieved by increasing the humidity in proportion to seawater.

Preferred Embodiment 7: This embodiment is described below with reference to FIG. 7 and FIG. 8. According to this embodiment, each lubrication unit 16 comprises an annular cylinder 16-1, an annular magnet 16-2, an aluminum slide 16-3 and a lubricating oil filter 16-4. The aluminum slide 16-3 is installed horizontally in a lower part 14-1 of the component casing 14. The component casing 14 is casing made of aluminum. The lubricating oil filter 16-4 is embedded in the annular magnet 16-2, and the annular cylinder 16-1 is vertically sealed and installed on the annular magnet 16-2.

With this arrangement, the lubrication form of this embodiment is mainly based on the vibration generated by the test planetary gearbox 7 during operation to drip the lubricating oil. At the same time, the multiple lubricating units 16 can also be dripped by the shaking generated by the same magnetic repulsion and vibration synergy on the slideway. Other components and connection relationships are the same as any one of those in the Preferred Embodiments 1-6.

According to this embodiment, neither the aluminum slide nor the aluminum casing has an adsorption effect on the annular magnet 16-2. Furthermore, the annular magnet 16-2 can slide at any position in the aluminum slide 16-3, and the annular magnets 16-2 in two adjacent lubrication units 16 have the same magnetism. This ensures that the distance between multiple lubrication units 16 is maintained, and oil is dripped at different positions to achieve lubrication.

Since lubrication is one of the basic tasks of gearbox management, good lubrication status can help ensure the reliable operation of the gearbox, reduce friction power consumption, reduce temperature rise and wear and lubricant consumption, and avoid excessive wear of gears and bearings. The present invention adopts dripping method for lubrication, effectively utilizes the vibration of the gearbox for lubrication, and saves the amount of lubricating oil.

Preferred Embodiment 8: This embodiment is described below with reference to FIG. 7 and FIG. 8. According to this embodiment, the lubricating oil filter 16-4 has a middle part 16-4-1 with a concave downward structure. With this arrangement, accurate dripping of lubricant is facilitated. Other components and connection relationships are the same as any one of those in the Preferred Embodiments 1-7.

Preferred Embodiment 9: This embodiment is described below with reference to FIG. 8. According to this embodiment, a mesh size of the lubricating oil filter 16-4 is 150-300 mesh. With this arrangement, the dripping of lubricating oil realized under the synergistic effect of vibration and shaking, and the control of dripping amount of lubricating oil are facilitated. Also, impurities in lubricating oil can be filtered out. Other components and connection relationships are the same as any one of those in the Preferred Embodiments 1-8.

Preferred Embodiment 10: This embodiment is described below with reference to FIG. 7, FIG. 10 and FIG. 11. According to this embodiment, the corrosive medium inlet unit 17 comprises a medium inlet pipe 17-1 and a medium nozzle 17-2. The medium inlet pipe 17-1 is sealed and inserted into the lower part 14-1 of the component casing 14 and extends into the component casing 14. The medium nozzle 17-2 is sealingly connected to one end of the medium inlet pipe 17-1 located in the component casing 14.

With this arrangement, the medium inlet pipe 17-1 is made of anti-corrosion material. Other components and connection relationships are the same as any one of those in the Preferred Embodiments 1-9.

Figure 10:
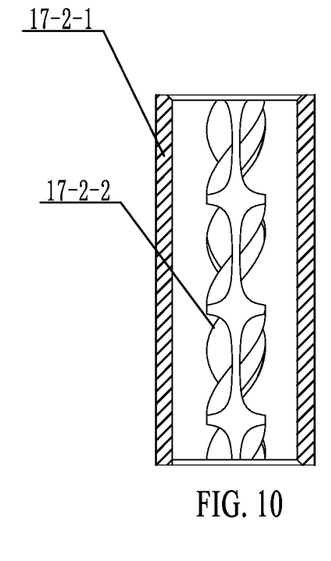
FIG. 10 is a schematic structural diagram of the medium nozzle 17-2 having one set of spiral blades 17-2-2.
Figure 11:
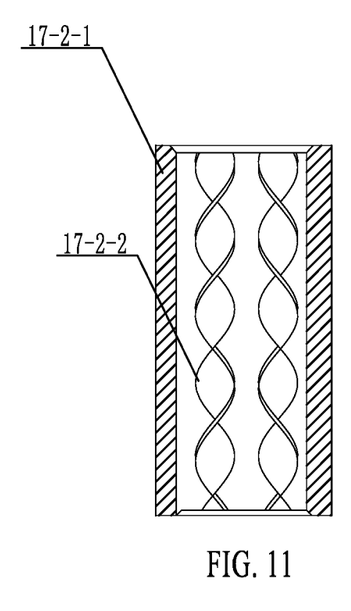
FIG. 11 is a schematic structural diagram of the medium nozzle 17-2 having two sets of spiral blades 17-2-2.

According to this embodiment, when the medium nozzle 17-2 is actually used, its installation angle can be adjusted arbitrarily. However, the medium nozzle 17-2 faces the component casing 14 and has an included angle with the component casing 14, which facilitates ensuring the randomness of the injected medium and is more consistent with the uncertainty in the marine environment.

Preferred Embodiment 11: This embodiment is described below with reference to FIG. 10 and FIG. 11. According to this embodiment, the medium nozzle 17-2 comprises a nozzle housing 17-2-1 and at least one set of spiral blades 17-2-2. The spiral blade 17-2-2 is installed in the nozzle housing 17-2-1 to realize the disturbance of the entrance angle of the corrosive medium.

With this arrangement, different numbers of spiral blades cause the incoming medium to be spirally affected, resulting in different entrance angles. Other components and connection relationships are the same as any one of those in the Preferred Embodiments 1-10.

The working principle of the present invention is further explained with reference to FIG. 1 to FIG. 13:

According to the present invention, the driving device provides the required rotation speed for the test platform, and its power is only used to overcome the friction power consumption of the entire test platform, which is related to the friction power consumption of each equipment in the test platform, and is generally 5~10% of the power of the test planetary gearbox; and the loading device provides the required torque to the test platform.

The test principle of the present invention: the high-power back-to-back planetary gear test bench is loaded in a mechanical closed power mode. During the test, the driving device drives the entire test platform to the test speed required for testing the planetary gearbox, and then the loading device provides the required torque to the test planetary gearbox, loading to any torque value in real time, and loading smoothly without impact.

The ocean simulation principle of the present invention: an external ocean working condition simulation device is connected to the corrosive medium inlet unit 17, and according to the actual use environment and test data collection needs, salt spray, raindrops, sand, high humidity and other media are introduced separately or simultaneously for a certain period of time to achieve multi-working condition simulation.

Although the present invention has been disclosed above in terms of preferred embodiments, this is not intended to limit the present invention. Those skilled in the art can also make other changes within the spirit of the present invention and apply it to fields not mentioned in the present invention. Of course, these changes made based on the spirit of the present invention should be included in the scope of protection claimed by the present invention.

What is claimed is:

1. A high-power and heavy-load back-to-back planetary gear test platform, which comprises a driving device (1), a first shaft coupling (2), a speed increaser (3), a second shaft coupling (4) and a speed and torque meter (5) connected in sequence from left to right, characterized in that: said test platform further comprises a back-to-back planetary gearbox closed power system (18) and a marine test component (140), said back-to-back planetary gearbox closed power system (18) comprises a third shaft coupling (6), a test planetary gearbox (7), a first linkage mechanism (8), a torsion shaft assembly (9), a test companion gearbox (10), a fourth shaft coupling (11), second linkage mechanism (12) and a loading device (13), wherein the speed and torque meter (5) is connected to one end of the test planetary gearbox (7) through the third shaft coupling (6), another end of the test planetary gearbox (7) and one end of the test companion gearbox (10) are connected through the torsion shaft assembly (9), torsion shaft assembly (8) is installed on the torsion shaft assembly (9) located between another end of the test planetary gearbox (7) and one end of the test companion gearbox (10), another end of the test companion gearbox (10) and the loading device (13) are connected through the fourth shaft coupling (11), and the second linkage mechanism (12) is installed on the fourth shaft coupling (11), the torsion shaft assembly (9) comprises a clamping groove body (9-2), a clamping assembly (9-3) and a plurality of shaft segments (9-1), a first shaft segment (9-1) of two adjacent shaft segments (9-1) has an axial positioning protrusion (9-4) processed on a side end surface at a position opposite to a second shaft segment (9-1) of the two adjacent shaft segments (9-1), while the second shaft segment (9-1) has an axial positioning groove (9-5) processed at a side end surface on one side at a position corresponding to the axial positioning protrusion (9-4), the clamping groove body (9-2) is coaxially installed on the axial positioning protrusion (9-4), the clamping component (9-3) is embedded inside the axial positioning groove (9-5), the second shaft segment (9-1) is coaxially installed on the clamping groove body (9-2) so that the clamping groove body (9-2) and the axial positioning protrusion (9-4) are tightly clamped through an axial displacement provided by the clamping component (9-3), and the clamping groove body (9-2) generates a radial displacement under an axial pushing of the clamping component (9-3) and is expanded in the radial direction to tightly connect with the axial positioning groove (9-5) of the second shaft segment (9-1);

the clamping groove body (9-2) is a cylindrical groove body with an inverted tapered groove, and the cylindrical groove body has a plurality of elongated holes (9-6) along its axial direction thereon;

the clamping component (9-3) comprises an upper clamping unit (9-7), a lower clamping unit (9-8) and a clamping moving block (9-9), wherein the upper clamping unit (9-7) and the lower clamping unit (9-8) are arranged at a left side and a right side along the axial direction inside the axial positioning groove (9-5) while the lower clamping unit (9-8) is biased against a bottom end surface (951) of the axial positioning groove (9-5), the upper clamping unit (9-7) and the lower clamping unit (9-8) have a corresponding side facing each other and are processed with inclined surfaces such that the inclined surfaces of the upper clamping unit (9-7) and the inclined surface of the lower clamping unit (9-8) form an inverted tapered space, the clamping moving block (9-9) is slidably installed inside the inverted tapered space and an outer side wall of the clamping moving block (9-9) is in contact with the inclined surface of the upper clamping unit (9-7) and the inclined surface of the lower clamping unit (9-8) respectively;

the marine test component (140) is installed on an outer casing (71) of the test planetary gearbox (7) and provides corrosive medium and lubricating oil for the test planetary gearbox (7) to realize simulated marine environment testing.

2. The high-power and heavy-load back-to-back planetary gear test platform according to claim 1, characterized in that: both the upper clamping unit (9-7) and the lower clamping unit (9-8) comprises two semi-circular arc-shaped clamping blocks (9-10), the two semi-circular arc-shaped clamping blocks (9-10) are arranged opposite to each other in the same plane and form a circular ring, and a gap (9-10-1) is formed between the two semi-circular arc-shaped clamping blocks (9-10).

3. The high-power and heavy-load back-to-back planetary gear test platform according to claim 1, characterized in that, the torsion shaft assembly (9) comprises a disassembly device (90), wherein the disassembly device (90) is embedded in the shaft segment (9-1) and extends towards the side of the axial positioning protrusion (9-4) until pushing down the clamping groove body (9-2), wherein the disassembly device (90) comprises a screw (9-11), a disassembly nut (9-12), a driven bevel gear (9-13), a driving bevel gear (9-14), an axle (9-15) and an end cover (9-16), the screw (9-11) is horizontally and rotatably installed along the axis of the shaft segment (9-1) in the axial opening (9-1-1) of the shaft segment (9-1), the axle (9-15) is installed vertically and rotatably in a vertical opening (9-1-2) of the shaft segment (9-1) along the radial direction of the shaft segment (9-1), and the axial opening (9-1-1) and the vertical opening (9-1-2) are interconnected therethrough; the driving bevel gear (9-14) is installed on the wheel shaft (9-15), the driven bevel gear (9-13) is installed on the head (9-11-1) of the screw (9-11), the driving bevel gear (9-14) meshes with the driven bevel gear (9-13), the disassembly nut (9-12) is installed on an end portion (9-11-2) of the screw (9-11), and the end cover (9-16) is installed on the vertical opening.

4. The high-power and heavy-load back-to-back planetary gear test platform according to claim 3, characterized in that, the marine test component (140) comprises a component casing (14), a sealing cover (15), a corrosive medium inlet unit (17) and a plurality of lubrication units (16), wherein the component casing (14) is installed on the test planetary gearbox (7) through a sealing cover (15), the plurality of lubrication units (16) are installed vertically in the component casing (14) and provide lubrication media inside the test planetary gearbox (7) through dripping lubrication media, the corrosive medium inlet unit (17) is sealed and inserted into the lower part (14-1) of the component casing (14) and provides corrosive medium to the inside of the test planetary gearbox (7).

5. The high-power and heavy-load back-to-back planetary gear test platform according to claim 4, characterized in that, each lubrication unit (16) comprises an annular cylinder (16-1), an annular magnet (16-2), an aluminum slide (16-3) and a lubricating oil filter (16-4), wherein the aluminum slide (16-3) is installed horizontally in a lower part (14-1) of the component casing (14), the component casing (14) is a casing made of aluminum, the lubricating oil filter (16-4) is embedded on the annular magnet (16-2), and the annular cylinder (16-1) is vertically sealed and installed on the annular magnet (16-2).

6. The high-power and heavy-load back-to-back planetary gear test platform according to claim 5, characterized in that, the lubricating oil filter (16-4) has a middle part (16-4-1) with a concave downward structure, and a mesh size of the lubricating oil filter (16-4) is 150-300 mesh.

7. The high-power and heavy-load back-to-back planetary gear test platform according to claim 6, characterized in that, the corrosive medium inlet unit (17) comprises a medium inlet pipe (17-1) and a medium nozzle (17-2), wherein the medium inlet pipe (17-1) is sealed and inserted into the lower part (14-1) of the component casing (14) and extends toward the component casing (14), the medium nozzle (17-2) is sealingly connected to one end of the medium inlet pipe (17-1) located in the component casing (14).

8. The high-power and heavy-load back-to-back planetary gear test platform according to claim 7, characterized in that, the medium nozzle (17-2) comprises a nozzle housing (17-2-1) and at least one set of spiral blades (17-2-2), wherein the spiral blade (17-2-2) is installed in the nozzle housing (17-2-1) to realize a disturbance of an entrance angle of the corrosive medium.

* * * * *